(12) United States Patent
Atkin et al.

(10) Patent No.: US 8,769,404 B2
(45) Date of Patent: Jul. 1, 2014

(54) RULE-BASED LOCALE DEFINITION GENERATION FOR A NEW OR CUSTOMIZED LOCALE SUPPORT

(75) Inventors: Steven Edward Atkin, Tampa, FL (US); Su Liu, Round Rock, TX (US); Keiichi Yamamoto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/342,744

(22) Filed: Jan. 3, 2012

(65) Prior Publication Data

US 2013/0174027 A1 Jul. 4, 2013

(51) Int. Cl.
*G06F 17/00* (2006.01)

(52) U.S. Cl.
USPC .......................................... 715/255; 715/200

(58) Field of Classification Search
USPC .......................................... 715/255, 200, 264
See application file for complete search history.

(56) References Cited

U.S. PATENT DOCUMENTS

| | | | |
|---|---|---|---|
| 5,742,829 A | 4/1998 | Davis et al. .................. 717/178 |
| 5,835,768 A | 11/1998 | Miller et al. .................. 395/682 |
| 5,900,871 A | 5/1999 | Atkin et al. .................. 715/866 |
| 5,917,484 A * | 6/1999 | Mullaney ....................... 715/703 |
| 6,157,905 A * | 12/2000 | Powell ............................... 704/2 |
| 6,204,782 B1 | 3/2001 | Gonzalez et al. |
| 6,292,941 B1 | 9/2001 | Jollands |
| 6,882,353 B2 | 4/2005 | Nettles et al. .................. 345/764 |
| 6,928,438 B2 | 8/2005 | Daray et al. ....................... 704/8 |
| 7,305,021 B2 | 12/2007 | Ledvina et al. ................. 375/137 |
| 7,363,586 B1 | 4/2008 | Briggs et al. |
| 7,441,184 B2 * | 10/2008 | Frerebeau et al. ............. 715/234 |
| 7,607,085 B1 * | 10/2009 | Lassesen ........................ 715/264 |
| 7,610,548 B1 | 10/2009 | Brinkman et al. ............. 715/221 |
| 7,698,642 B1 * | 4/2010 | Sarin ............................. 715/703 |
| 2004/0172601 A1 | 9/2004 | Rettig et al. |
| 2005/0009538 A1 | 1/2005 | MacKay et al. |
| 2005/0137846 A1 | 6/2005 | Rose et al. |
| 2005/0138146 A1 | 6/2005 | Rose et al. |
| 2006/0059424 A1 | 3/2006 | Petri et al. ...................... 715/255 |
| 2006/0206871 A1 | 9/2006 | Kohlmeier et al. |
| 2006/0277286 A1 * | 12/2006 | Zhang et al. ................... 709/223 |
| 2008/0066056 A1 | 3/2008 | Inoue ............................ 717/124 |
| 2008/0162116 A1 | 7/2008 | Briggs et al. |
| 2009/0132232 A1 | 5/2009 | Trefler ............................. 704/2 |
| 2009/0220153 A1 | 9/2009 | Hall et al. ...................... 382/181 |
| 2010/0088695 A1 | 4/2010 | Kakinari et al. |

(Continued)

OTHER PUBLICATIONS

Rose et al, "Language Independent Interfaces for Locale Definition and Creation," IBM Technical Disclosure Bulletin, TDB vol. 38, No. 10, International Business Machines Corporation, Oct. 1, 1995, pp. 461-462.

(Continued)

*Primary Examiner* — Manglesh M Patel
(74) *Attorney, Agent, or Firm* — VanLeeuwen & VanLeeuwen; John D. Flynn (57) ABSTRACT

An approach is provided in which a computer system receives a selection of a first set of information included on a first page of data. The computer system generates a locale package that includes one or more display format parameters that correspond to the format of the selected information. In turn, the computer system subsequently displays a second set of information on a second page of data based upon the one or more display format parameters included in the generated locale package.

22 Claims, 10 Drawing Sheets

(56) References Cited

U.S. PATENT DOCUMENTS

2010/0100369 A1    4/2010  Shetty et al.
2010/0107114 A1*   4/2010  Zachcial .................. 715/780
2012/0016929 A1*   1/2012  Travieso et al. ............ 709/203
2012/0054599 A1*   3/2012  Nixon et al. ................ 715/236

OTHER PUBLICATIONS

"A Rule-Driven System to Automate Document Translation Based on Locale," International Business Machines Corporation, Nov. 14, 2008, 5 pages.

Laughlin, "Virtualization of System Locales on Windows Systems," Microsoft Corporation, IPCOM000171461D, Jun. 10, 2008, 9 pages.

Kloppmann et al, "Compile-time Verification of Relational Database Lock-types for Persistent Objects," IBM Research Disclosure, vol. 41, No. 413, International Business Machines Corporation, Sep. 1, 1998, 3 pages.

"Unicode Technical Standard #35, Unicode Locale Data Markup Language (LDML)," Unicode, Inc., 2001-2011, 236 pages.

Office Action for U.S. Appl. No. 13/342,786 (Steven Edward Atkin, "Detecting, Compiling, and Updating a New Locale Object in Real Time," filed Jan. 3, 2012), mailed Oct. 25, 2013, 18 pages.

Notice of Allowance for U.S. Appl. No. 13/342,786 (Steven Edward Atkin, "Detecting, Compiling, and Updating a New Locale Object in Real Time," filed Jan. 3, 2012), mailed Mar. 14, 2014, 14 pages.

* cited by examiner

FIG. 1

Pseudo-code
200

```
setlocale(ll_CC){ /*Load ll_CC object */
  if (localeAvailable(ll_CC) and recently_installed(ll_CC)){
    locale_object=Load(ll_CC))
    return (locale_object);
  }                                                              — 210
  else { /*Locale Package is available, Installed */
    if (hasPackage(ll_CC) && packgeUpdatedRecently(ll_CC)){ installLocale(ll_CC);
      testLocale(ll_CC);
      if (locale_object=Load(ll_CC)){
        return (locale_object);                                  — 220
      }
      else{
        locale_object=Load(defaultLocale);
        return(locale_object);                                   — 230
      }
    }
    else { /*Locale Package is NOT available */
      if (hasSeedFile(ll_CC)){ /*Downlaod, Build and Install it */
        getSeedFile(ll_CC);
        buildLocale(ll_CC);
        installLocale(ll_CC);
        testLocale(ll_CC);                                        — 240
        uploadLocale(ll_CC);
        if (locale_object=Load(ll_CC)){
          return (locale_object);
        }
        else{
          locale_object=Load(defaultLocale);
          return(locale_object);                                  — 250
        }
      }
    }
  }
}
```

RULE-BASED LOCALE DEFINITION GENERATION FOR A NEW OR CUSTOMIZED LOCALE SUPPORT

BACKGROUND

The present disclosure relates to dynamically generating locale packages and installing the dynamically generated locale packages on an operating system. More particularly, the present disclosure relates to generating a locale package based on information that a user selects on a page of data and displaying subsequent information according to the generated locale package.

In globalization computing, a "locale package" is a set of parameters (locale definitions) that define display parameters of information. The set of parameters may identify a user's language and country, as well as define the manner in which to display dates, times, currency, numbers, etc. In most globalized computer operating systems, software vendors pre-build the locale packages and ship the locale packages with the operating systems as extension components. In turn, the operating systems utilize the locale definitions included in the locale packages to display information on a display.

BRIEF SUMMARY

According to one embodiment of the present disclosure, an approach is provided in which a computer system receives a selection of a first set of information included on a first page of data. The computer system generates a locale package that includes one or more display format parameters that correspond to the format of the selected information. In turn, the computer system subsequently displays a second set of information on a second page of data based upon the one or more display format parameters included in the generated locale package.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

A dynamic locale object generator enables a user to construct a locale package based upon information that the user selects on a page of data. The dynamic locale object generator provides a real-time customized locale package environment without requiring the user to have knowledge of operating system API's or tools to generate locale packages.

Figure 1:
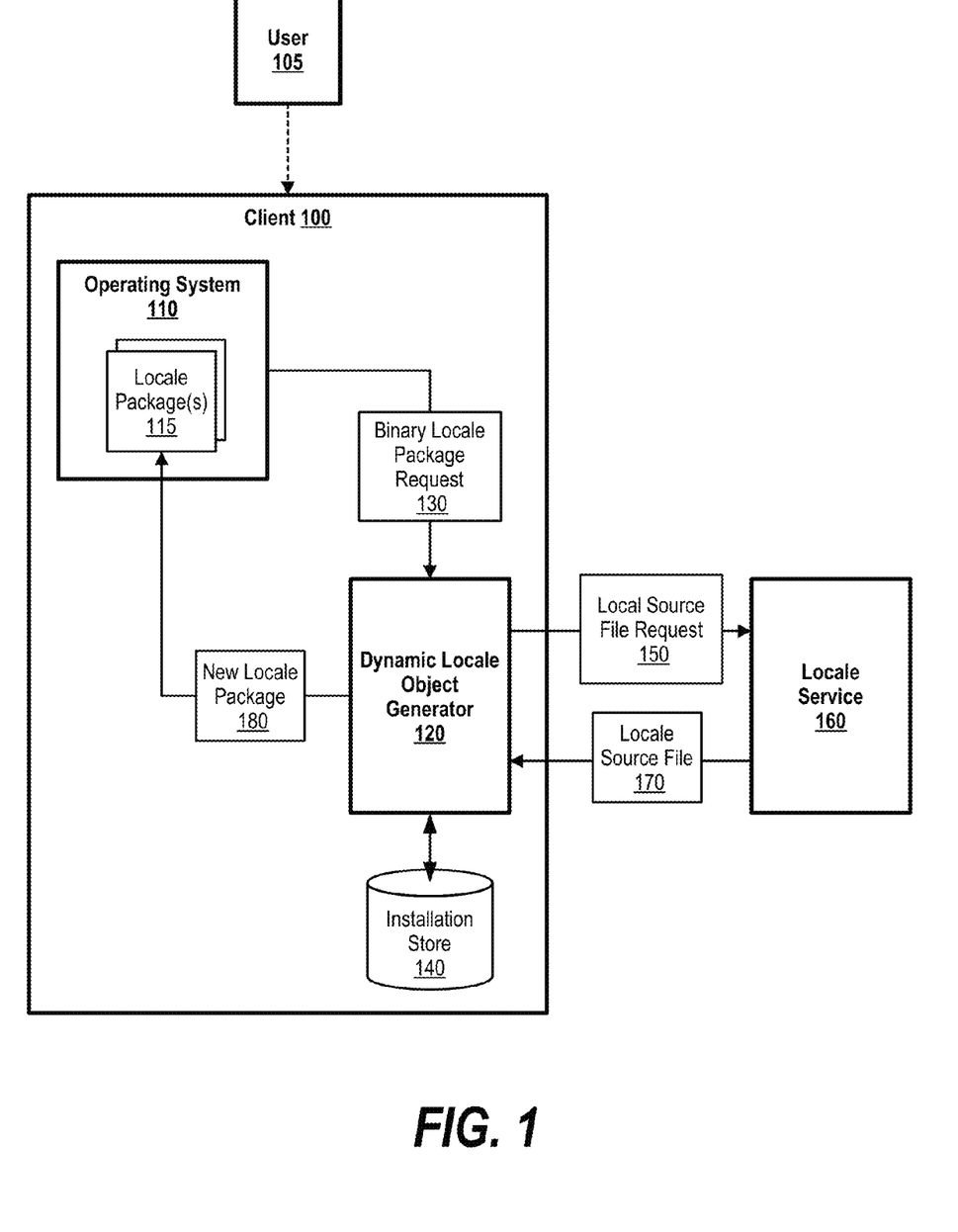
FIG. 1 is a high-level diagram showing a client computer system dynamically generating locale packages in response to new locale requests.

FIG. 1 is a high-level diagram showing a client computer system dynamically generating locale packages in response to new locale requests. Client 100 includes dynamic locale object generator 120, which dynamically generates locale packages from source files received from locale service 160. As discussed herein, a locale package is utilized by a computer system and includes one or more parameters (locale definitions) that defines a user's language, country, and/or special variant user interface preferences.

Client 100 includes operating system 110, which includes locale packages 115 that are currently installed and ready for use by applications executing on client 100. At some point, client 100 receives a locale request from user 105. In one embodiment, an application executing on client 100 may initiate the locale request. Operating system 110 determines whether the locale request pertains to one of locale packages 115 currently installed on operating system 115. If so, operating system 110 selects (loads) the corresponding locale package and processes/displays information based upon the newly selected locale package.

When the requested locale is not included in locale packages 115, operating system 110 sends binary locale package request 130 to dynamic locale object generator 120. In one embodiment, dynamic locale object generator 120 executes on operating system 115.

Dynamic locale object generator 120 checks whether the requested locale package is stored in local installation store 140. For example, the requested locale package may reside on client 100 in a local storage area, but the requested locale package may not yet be loaded on operating system 110. If the requested locale package resides in installation store 140, dynamic locale object generator 120 retrieves the requested locale package and installs new locale package 180 on operating system 110. In one embodiment, dynamic locale object generator 120 determines whether the locale package stored in installation store 140 is a recent version before installing new locale package 180 on operating system 110.

However, when the requested locale package is not located in installation store 140, dynamic locale object generator 120 sends locale source file request 150 to locale service 160. In turn, locale service 160 sends locale source file 170 to dynamic locale object generator 120. In one embodiment, dynamic locale object generator 120 proceeds through a series of steps before requesting a locale source file from locale service 160, such as determining whether a request has been recently sent to locale service 160 for the locale source file (see FIG. 3, and corresponding text for further details).

Dynamic locale object generator 120 compiles locale source file 170 and generates a new locale package. Dynamic locale object generator 120 tests the new locale package and, in turn, installs the new locale package (new locale package 180) on operating system 110. The next time user 105 requests the same locale package, operating system 110 selects (loads) the newly installed locale package and processes/displays information based upon the newly selected locale package. In one embodiment, dynamic locale object generator 120 stores the newly generated locale package in installation store 140 for future use.

Figure 2:
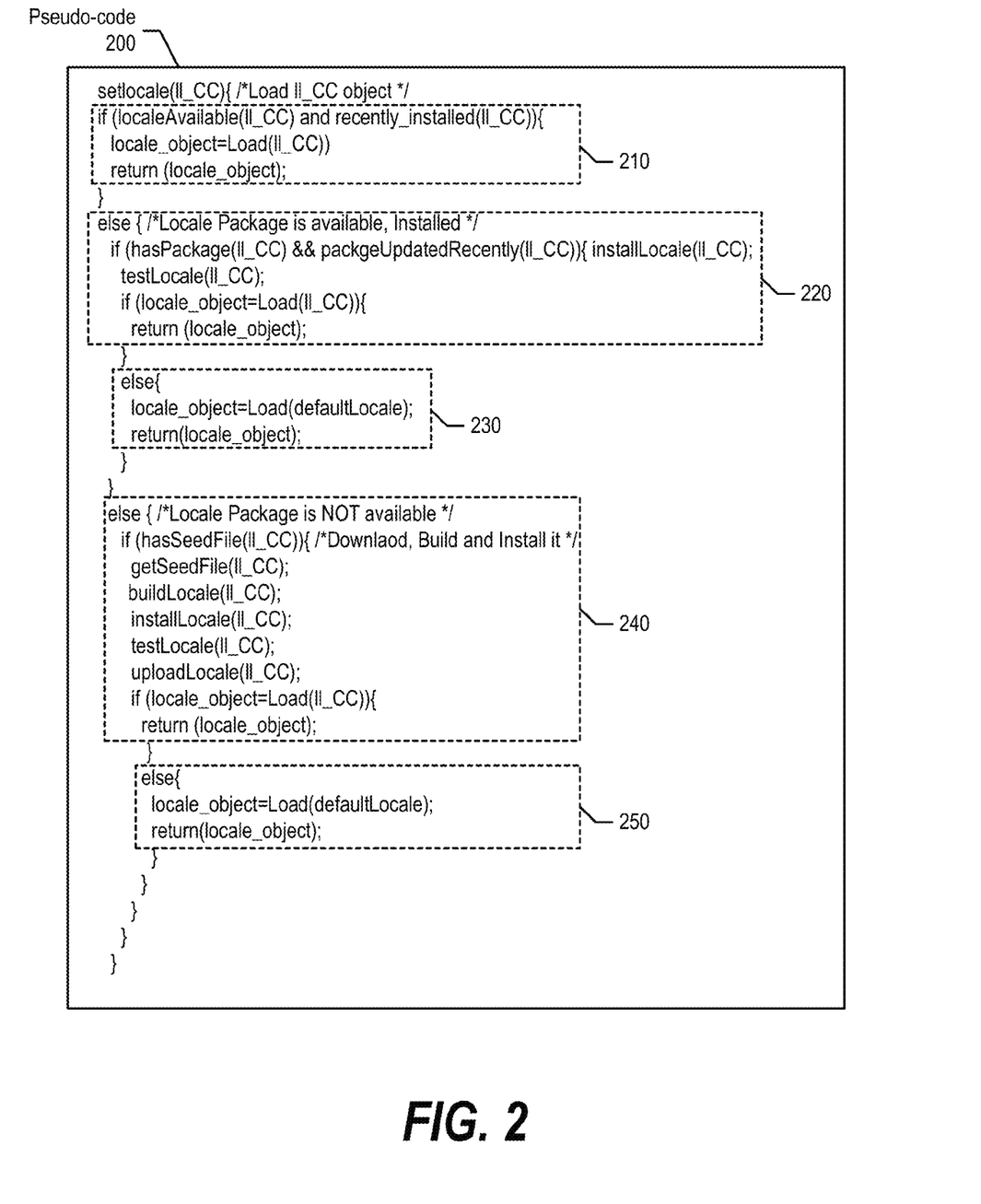
FIG. 2 is a diagram of pseudo-code utilized by the dynamic locale object generator to dynamically fulfill new locale requests.

FIG. 2 is an exemplary diagram of pseudo-code utilized by the dynamic locale object generator to dynamically fulfill new locale requests. The dynamic locale object generator performs iterative steps that automatically identifies, generates (if required), and installs a locale package on an operating system. Pseudo-code 200 includes "setlocale," which is a function that includes code segments 210-250. Code 210 checks whether a requested locale package is already recently installed on the operating system and loads accordingly. If not, code 220 checks whether a locale package is available (e.g., in installation store 140) that has been updated recently. If so, code 220 installs the locale package on the operating system.

If the requested locale is not available (not installed), or locale version is older than user defined criteria date in the system, then code 230 selects (loads) a default locale package. Code 240 sends request to a locale service and receives a locale source file. Code 240 then generates a locale package from the locale source file, tests the generated locale package, and installs the newly generated locale package on the operating system.

When the locale service does not provide a corresponding locale source file, or if the locale package fails the test, code 250 loads the default locale package on the operating system.

Figure 3:
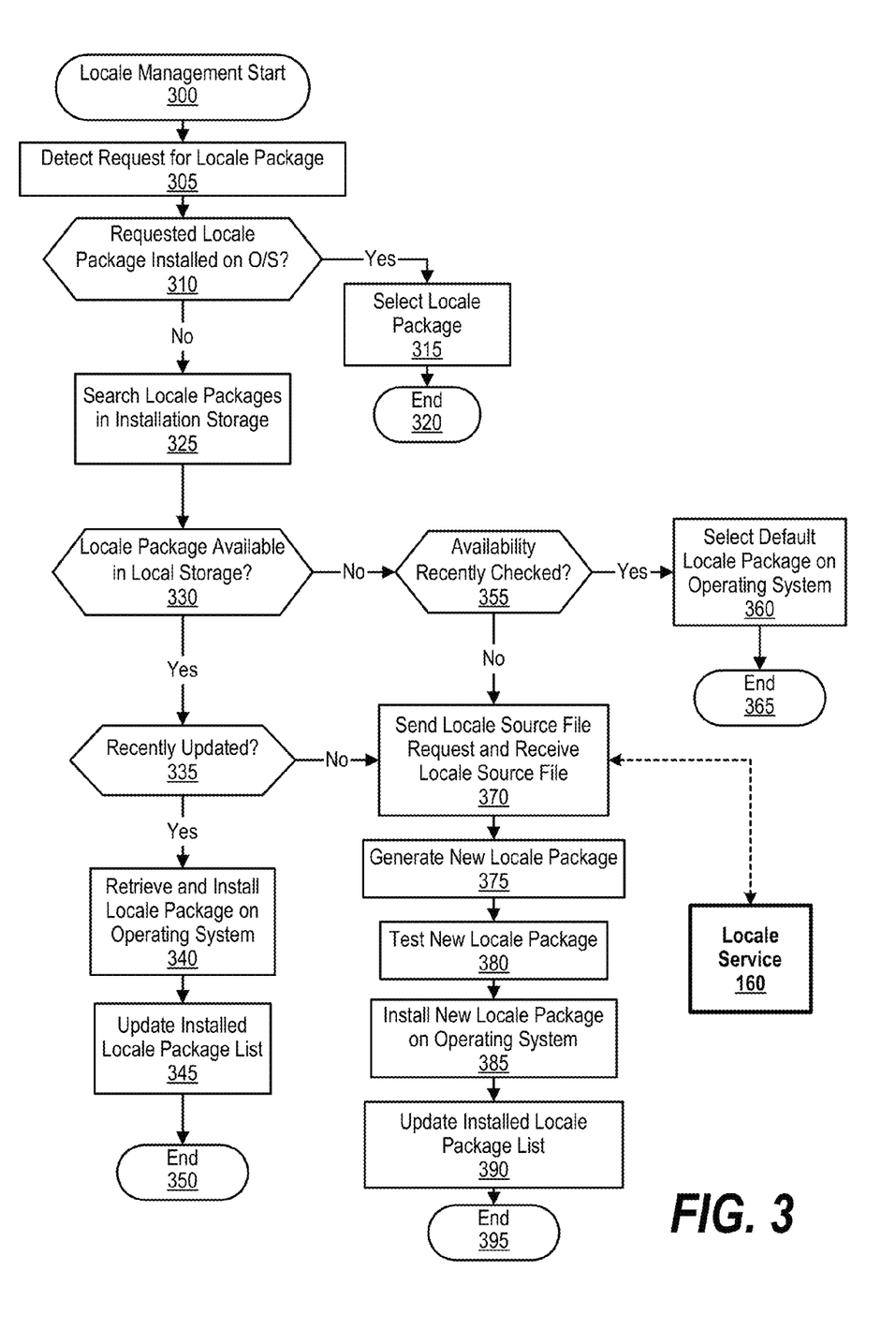
FIG. 3 is a flowchart showing steps taken in automatically servicing locale package requests.

FIG. 3 is a flowchart showing steps taken in automatically servicing locale package requests. Processing commences at 300, whereupon processing (e.g., an operating system) receives a request for a locale package at step 305. For example, a user may request to change the default locale package to a different locale package based upon the user's location and/or work environment. In one embodiment, an application may request a locale package change in order to display information in a certain format.

A determination is made as to whether the requested locale package is already installed in the operating system (decision 310). If the locale package is already installed, decision 310 branches to the "Yes" branch, whereupon the operating system selects and utilizes the requested locale package at step 315. Processing ends at 320.

On the other hand, if the requested locale package is not currently installed in the operating system, decision 310 branches to the "No" branch, whereupon processing (e.g., dynamic locale object generator 120) searches locally stored locale packages in a local installation storage area (e.g., installation store 140) for the requested locale package (step 325).

A determination is made as to whether the requested locale package is located in the local installation storage area (decision 330). If the requested locale package is locally available, decision 330 branches to the "Yes" branch, whereupon a determination is made as to whether the locally available locale package has been recently updated (decision 335). For example, processing may determine that locale packages that have been updated within the past two weeks are recently updated. If the locale package has been recently updated, decision 335 branches to the "Yes" branch, whereupon processing retrieves the locale package from the local installation storage area and installs the locale package into the operating system (step 340). Processing updates the installed locale package list at step 345, and ends at 350.

Referring back to decision 335, if the locally available locale package has not been recently updated, decision 335 branches to the "No" branch, whereupon processing (e.g., dynamic locale object generator 120) sends a locale source file request to locale service 160 and receives a corresponding locale source file (e.g., seed file) at step 370. Next, at step 375, processing compiles the locale source file and generates a new locale package.

Processing then tests the new locale package at step 380. For example, if a currency symbol is defined as "<EURO_SIGN>" in a section of LC_MONETARY locale definition area of source code, then processing may issues a UNIX command "LOCALE-CK CURRENCY_SYMBOL," which should return a result of "€" (see FIG. 4 and corresponding text for further details). The new locale package is installed on the operating system at step 385 for use by operating system 385 and other applications to display information. Processing updates the installed locale list at step 390 and ends at 395.

Referring back to decision 330, if a locale package is not available in the local installation storage area, decision 330 branches to the "No" branch, whereupon processing determines whether a locale source file request has been recently sent to locale service 160 (decision 355). If a locale source file request has been recently sent to locale service 160, decision 355 branches to the "Yes" branch, whereupon processing selects (loads) a default locale package for use by the operating system at step 360, and processing ends at 360.

On the other hand, of a locale source file request has not been recently sent to locale service 160, decision 355 branches to the "No" branch, whereupon processing proceeds through steps 370-395 as discussed above to generate, test, and install a new locale package.

Figure 4:
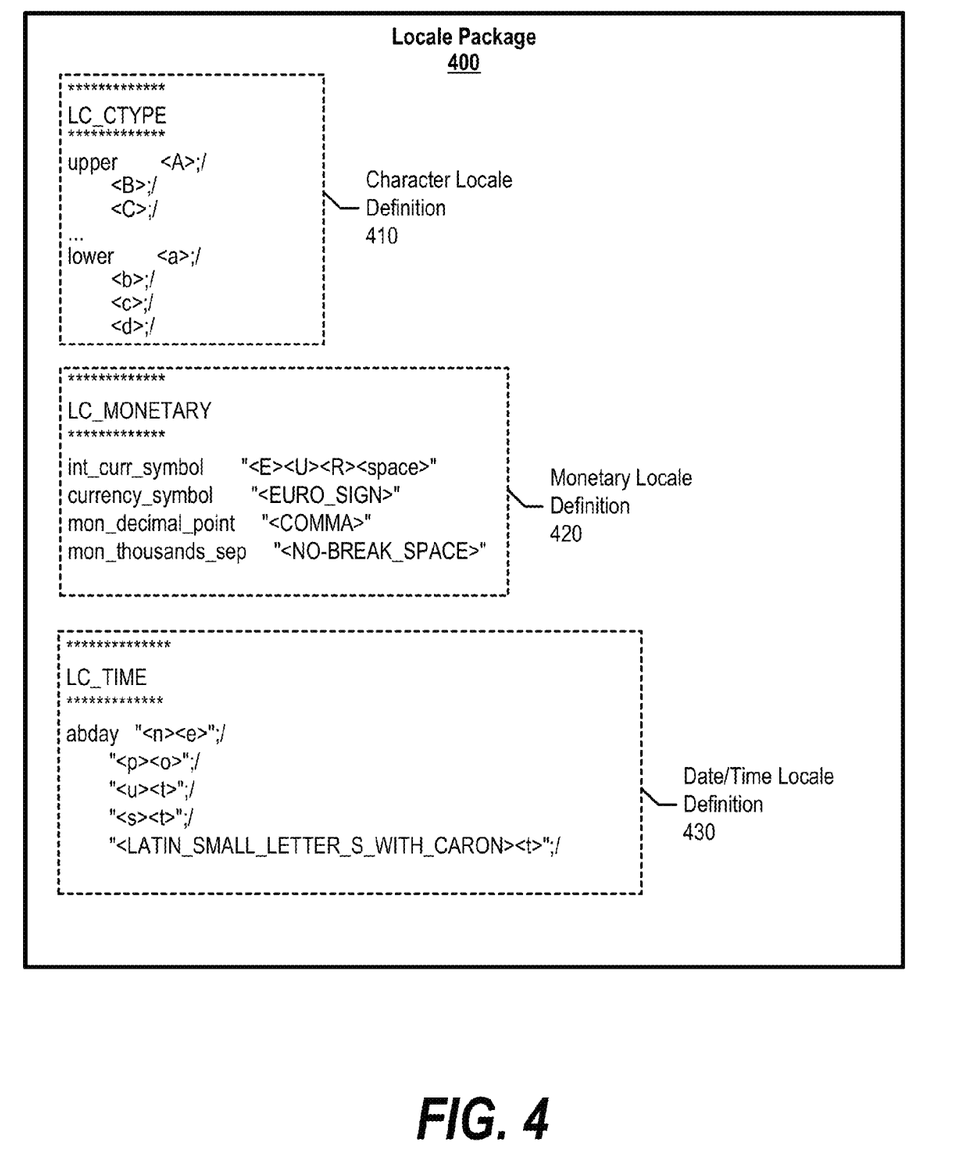
FIG. 4 is a diagram of locale definitions that are dynamically generated as a locale package.

FIG. 4 is an exemplary diagram of a dynamically generated locale package. Locale package 400 includes locale definitions 410, 420, and 430, each corresponding to a different locale type. Locale definitions 410, 420, and 430 include display format parameters that indicate a format for which to display information corresponding to their respective locale definitions. Locale definition 410 is a character locale type and specifies upper case/lower case character display format parameters. Locale definition 420 is a monetary locale type and specifies display format parameters pertaining to currency information, such as the currency symbol and whether the decimal point is a period or a comma. Locale definition 430 is a date/time locale type and specifies display format parameters pertaining to time and date information.

As those skilled in the art can appreciate, locale package 400 may include other locale definitions such as LC_ALL (Overrides all LC_* environment variables with the given value); LC_COLLATE (Collation (sort) order locale); LC_NUMERIC (Non-monetary numeric formats locale); LC_MESSAGES (informative and diagnostic message formats locale); LC_PAPER (Paper size locale); LC_NAME (Name formats locale); LC_ADDRESS (Address formats and location locale), etc.

Figure 5:
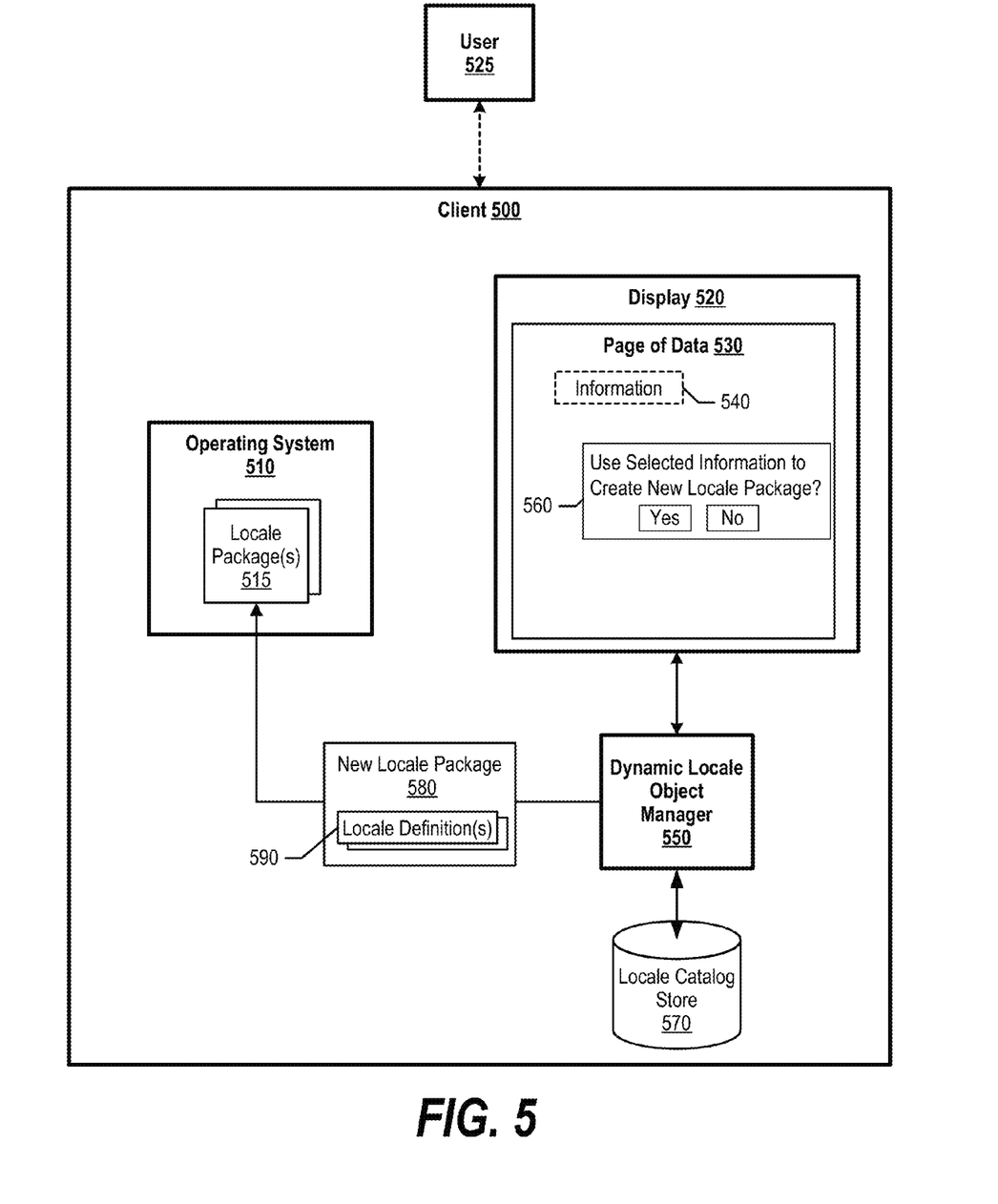
FIG. 5 is a diagram showing a dynamic locale object generator generating a new locale package based on a user's selection of information displayed a page of data.

FIG. 5 is a diagram showing a dynamic locale object generator generating a new locale package based on a user's selection of information displayed a page of data. As such, a user may dynamically construct a locale by without being knowledgeable of APIs and/or tools to generate locale packages.

Client 500 includes operating system 510, which includes locale packages 515 that are currently installed and available for use by applications executing on client 500. Client 500 also includes display 520, which displays page of data 530 to user 525 to view. At some point, user 525 identifies information 540 that has a particular format that user 525 would prefer to view in other pages of data, such as a format for displaying a time and date. As such, user 525 highlights information 540 on page of data 530.

Dynamic locale object generator 550 detects the highlighted information and displays pop-up window 560, which queries the user as to whether to generate a locale package based on the selected information. When the user selects the "Yes" button, dynamic locale object generator 550 captures the information and commences generating a new locale package.

Dynamic locale object generator 550 parses the selected information into unknown locale samples and compares each of the unknown locale samples with one or more catalog patterns stored in locale catalog store 545. When matches are found, dynamic locale object generator 550 stores locale definitions 590 corresponding to the matched catalog patterns in new locale package 580. In one embodiment, dynamic locale object generator 550 queries user 525 for a user-specified pattern to associate with an unknown locale sample (see FIG. 8 and corresponding text for further details).

Once dynamic locale object generator 550 processes each of the unknown locale samples included in information 540, dynamic locale object generator 550 installs new locale package 580 on operating system 510. In turn, operating system 510 utilizes (loads) new locale package 580 to display information on different pages of data for user 525 to view. In one embodiment, operating system 510's APIs are called to construct and install new locale definition 580.

Figure 6:
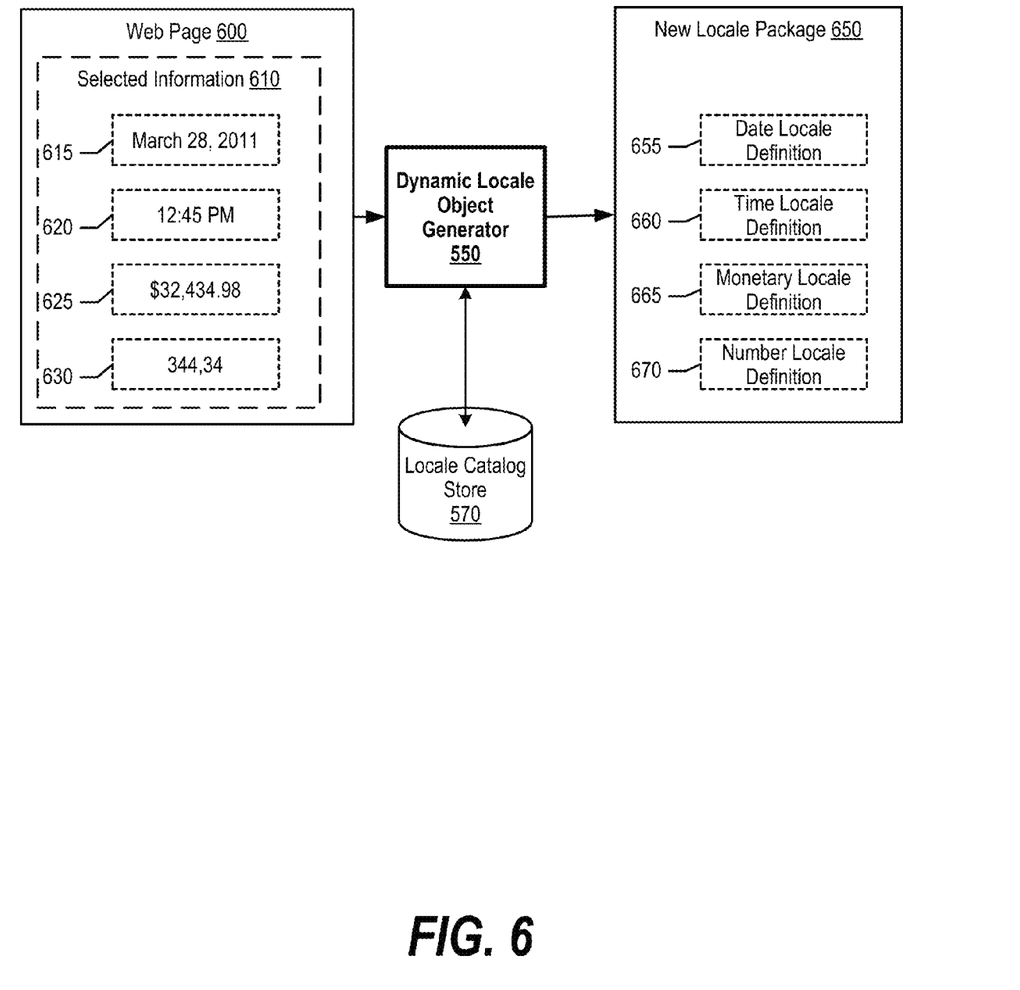
FIG. 6 is a diagram showing a dynamic locale object generator parsing selected information on a web page and generating multiple locale definitions that correspond to the parsed information.

FIG. 6 is a diagram showing a dynamic locale object generator parsing selected information on a web page and generating multiple locale definitions that correspond to the parsed information. A user selects information 610 displayed on web page 600, which includes date 615, time 620, currency 625, and number 630. Dynamic locale object generator 550 parses information 610 into unknown locale samples, thus individualizing each of information 615-630.

In turn, dynamic locale object generator 550 compares each of information 615-530 with catalog patterns stored in locale catalog store 570 to identify a matching pattern. For example, date 615 is in a format of "mm dd, yyyy" and dynamic locale object generator 550 compares date locale type patterns with information 615 until a match is found or a user provides a user-specified locale definition.

Once dynamic locale object generator 550 identifies a matching pattern, dynamic locale object generator 550 stores a corresponding locale definition in new locale package 650. As can be seen, date locale definition 655 corresponds to information 615, time locale definition 660 corresponds to information 620, monetary locale definition 665 corresponds to information 625, and number locale definition 670 corresponds to information 630.

Dynamic locale object generator 550 subsequently installs new locale package 650 on an operating system in order for the operating system to display information (e.g., dates, times, etc.) in a manner similar to that shown in information 610.

Figure 7:
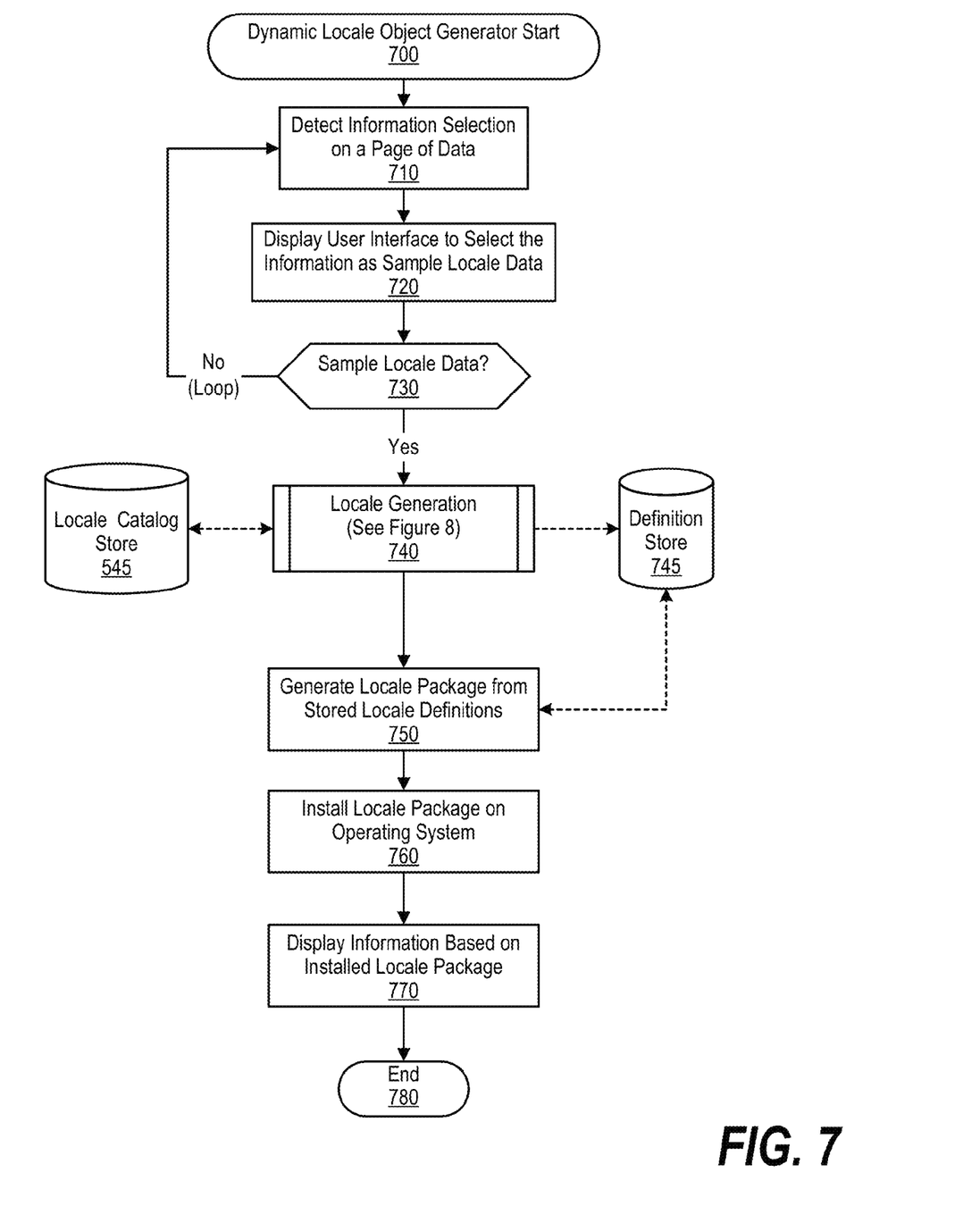
FIG. 7 is a flowchart showing steps taken in a dynamic locale object generator creating a locale package based upon sample data selected by a user.

FIG. 7 is a flowchart showing steps taken in a dynamic locale object generator creating a locale package based upon sample data selected by a user. Processing commences at 700, whereupon the dynamic locale object generator receives a selection of information on a page of data (step 710). For example, a user may be viewing a web page and the user may select a date with a particular format that the user prefers.

At step 720, processing displays a user interface (e.g., pop-up window 560 shown in FIG. 5) that allows the user to indicate whether the user wishes to create a locale based upon the selected information (decision 730). If the user does not wish to use the selected information to create a locale, decision 730 branches to the "No" branch, whereupon processing loops back to monitor user activity. On the other hand, if the user wishes to create a locale package based on the selected information, decision 730 branches to the "Yes" branch, whereupon processing proceeds through a series of steps to generate a locale package based upon the selected information. The selected information may be parsed into separate unknown locale samples (e.g., date, time, etc.) and matched with catalog patterns stored in locale data catalog store 545 in order to identify corresponding locale definitions to include in the locale package (pre-defined process block 740, see FIG. 8 and corresponding text for further details).

At step 750, processing generates a locale package that includes one or more locale definitions that correspond to the matched catalog patterns. Processing installs the locale package on the operating system at step 760. In turn, at step 770, the operating system displays information on pages of data in a format that is based upon the installed locale package. Processing ends at 780

Figure 8:
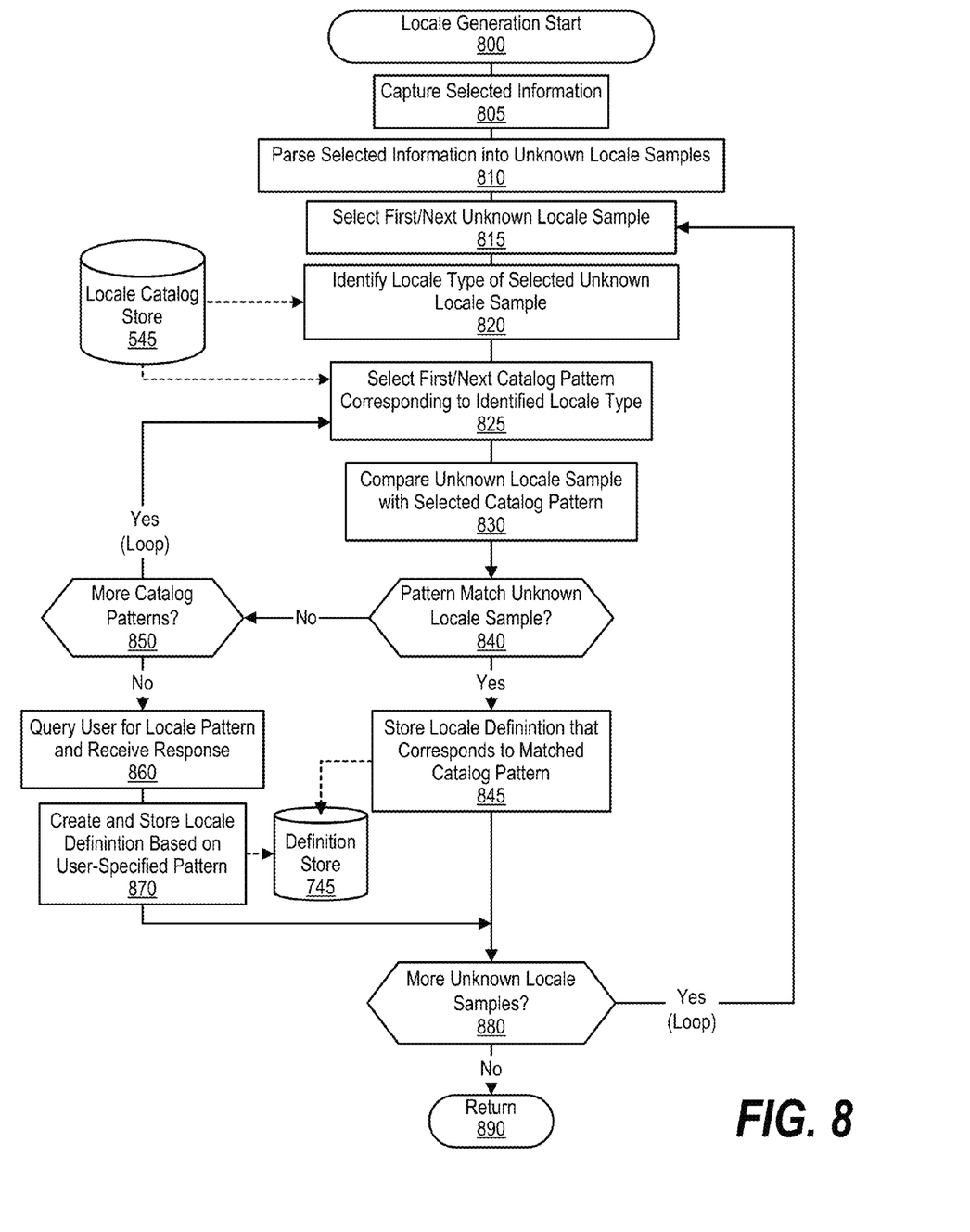
FIG. 8 is a flowchart showing steps taken in identifying and storing locale definitions that correspond to user-selected information.

FIG. 8 is a flowchart showing steps taken in identifying and storing locale definitions that correspond to user-selected information. Processing commences at 800, whereupon processing captures the user-selected information (step 805). At step 810, processing parses the selected information into unknown locale samples.

Processing selects the first sample pattern at step 815, and identifies a locale type of the selected unknown locale sample at step 820. For example, the unknown locale sample may include a currency symbol and is identified as a monetary locale type. Next, processing selects the first catalog pattern stored in locale data catalog store 545 with the identified locale type (step 825). For example, if the locale type is a "date," the first catalog pattern may be "mm dd, yyyy."

Processing compares the selected unknown locale sample with the selected catalog pattern at step 830, and a determination is made as to whether the comparison results in a match (decision 840). If the comparison results in a match, decision 840 branches to the "Yes" branch, whereupon processing stores a locale definition corresponding to the matched catalog pattern in definition store 745 (step 845).

On the other hand, if the catalog pattern does not match the unknown locale sample, decision 840 branches to the "No" branch, whereupon a determination is made as to whether there are more catalog patterns with the same locale type for which to compare with the selected unknown locale sample (decision 850). If there are more catalog patterns to compare with the selected unknown locale sample, decision 850 branches to the "Yes" branch, whereupon processing loops back to select and compare the next catalog pattern. This looping continues until there are no more catalog patterns to compare with the selected unknown locale sample, at which point decision 850 branches to the "No" branch.

At step 860, processing queries the user and receives a user-specified pattern format. For example, the sample pattern may be "2011, 24 January" and the catalog pattern may not include a "yyyy, dd mm" pattern. Processing saves a locale definition corresponding to the user-specified pattern in definition store 745 at step 870. In one embodiment, a user may indicate piece parts in the user-specified pattern format and processing converts these to standardized placeholders.

For example, if the unknown locale sample was an unknown currency format, the user indicates which elements are the currency symbol, the numeric portion, and decimal separators. In turn, processing, stores the actual currency symbol along with a standardized placeholder (e.g., international currency symbol "¤"). Likewise, in this example, processing stores corresponding placeholders for the numeric portion and decimal separators.

A determination is made as to whether there are more unknown locale sample to match that were included in the information (decision 880). If there are more unknown locale samples to match to catalog patterns, decision 880 branches to the "Yes" branch, which loops back to select and process the next unknown locale sample. This looping continues until there are no more unknown locale samples to process, at which point decision 880 branches to the "No" branch, whereupon processing returns at 890.

Figure 9:
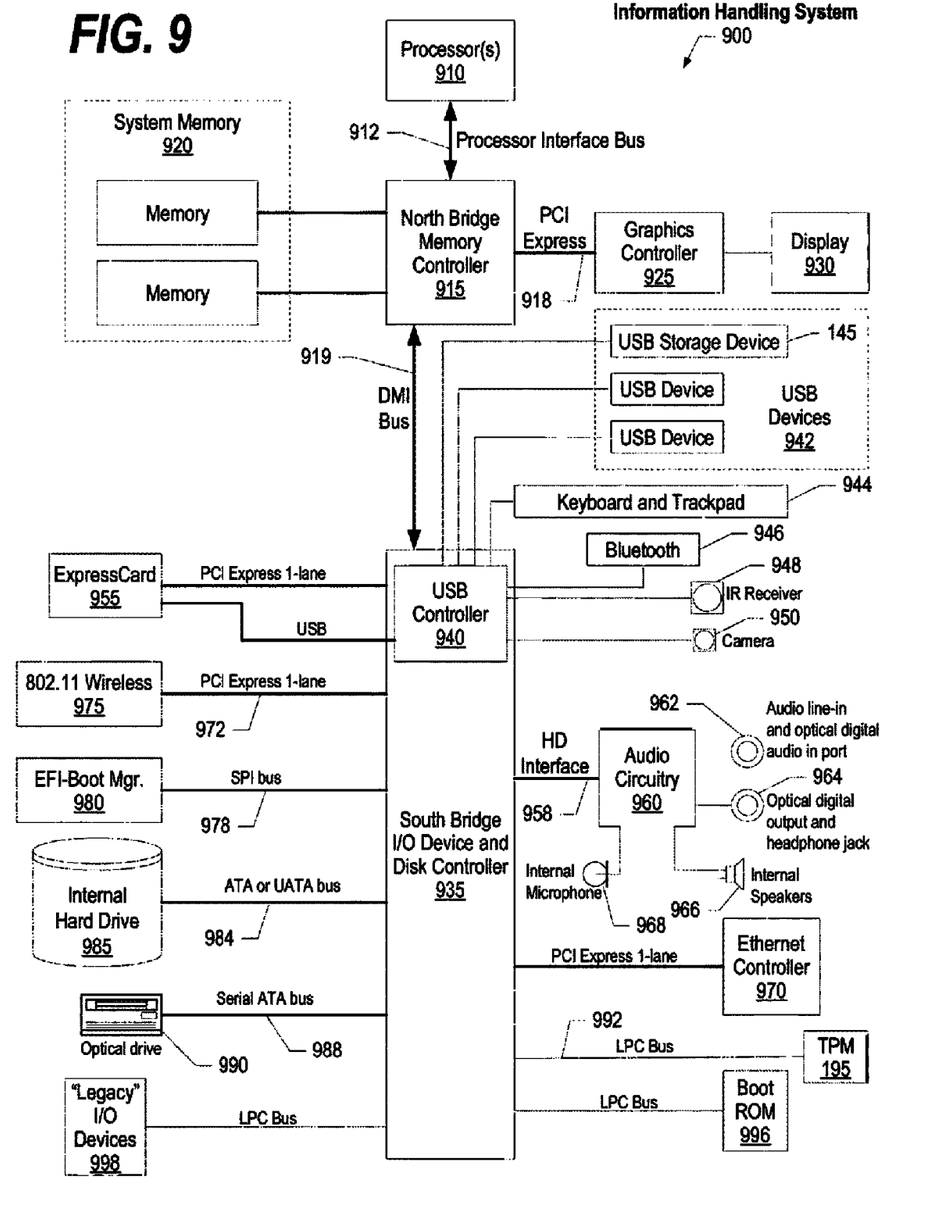
FIG. 9 is a block diagram of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 995) shown in FIG. 9 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 10.

Figure 10:
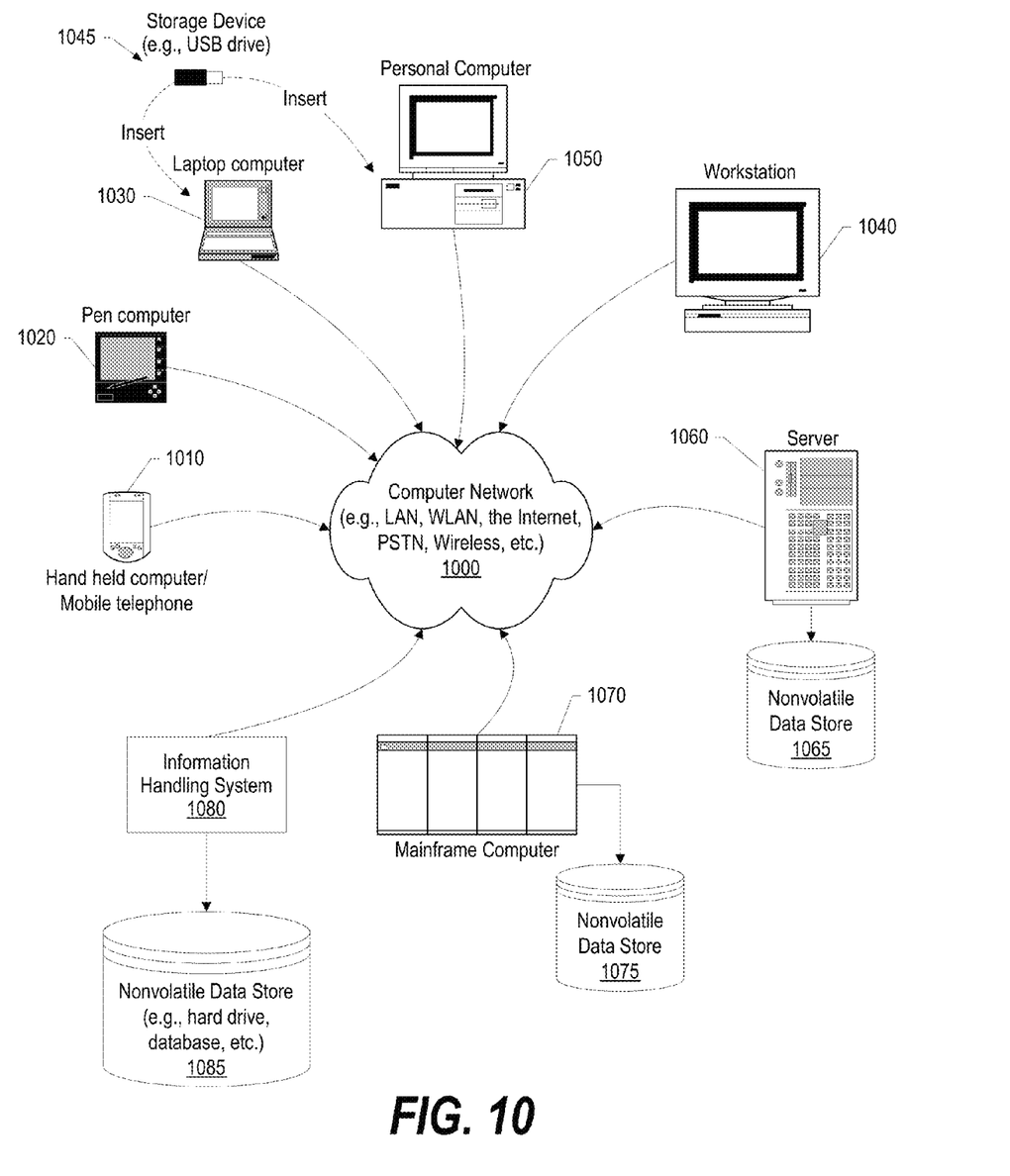
FIG. 10 provides an extension of the information handling system environment shown in FIG. 9 to illustrate that the methods described herein can be performed on a wide variety of information handling systems which operate in a networked environment.

FIG. 10 provides an extension of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
displaying a first page of data;
receiving a selection of a first set of information included in the first page of data;
parsing the first set of information into one or more unknown locale samples;
comparing a selected one of the unknown locale samples to one or more catalog patterns;
in response to the selected unknown locale sample matching one of the one or more catalog patterns, storing one or more display format parameters corresponding to the matched catalog pattern in a locale definition, the one or more display format parameters indicating a format of how the first set of information is displayed on the first page of data;
including the locale definition in a locale package;
installing the locale package on an operating system; and
displaying a second set of information on a second page of data according to the one or more display format parameters included in the locale package.

2. The method of claim 1 further comprising:
displaying a user interface in response to receiving the selection of the first set of information; and
receiving, in response to displaying the user interface, an indication from a user to generate the locale package utilizing the first set of information.

3. The method of claim 1 further comprising:
in response to determining that each of the one or more catalog patterns fail to match the selected unknown locale sample:
sending a request to a user for a user-specified locale pattern;
receiving the user-specified locale pattern from the user; and
storing the one or more display format parameters in a locale definition, the one or more display format parameters corresponding to the user-specified locale pattern; and
storing the locale definition in the locale package.

4. The method of claim 1 wherein the parsing results in a plurality unknown locale samples, the method further comprising:
matching one of the one or more catalog patterns with each of the plurality of unknown locale samples, the matching resulting in a plurality of matching catalog patterns; and
storing a plurality of locale definitions in the locale package that correspond to the plurality of matching catalog patterns.

5. The method of claim 1 wherein the locale definition corresponds to a locale type that is selected from the group consisting of a language locale type, a country locale type, a currency locale type, a monetary locale type, a time locale type, and a date locale type.

6. The method of claim 1 further comprising:
storing the locale package in a locale storage area; and
installing the locale package on an operating system.

7. The method of claim 1 further comprising:
uploading the locale package to a locale service.

8. An information handling system comprising:
one or more processors;
a memory coupled to at least one of the processors;
a set of computer program instructions stored in the memory and executed by at least one of the processors in order to perform actions of:
displaying a first page of data;
receiving a selection of a first set of information included in the first page of data;
parsing the first set of information into one or more unknown locale samples;
comparing a selected one of the unknown locale samples to one or more catalog patterns;
in response to the selected unknown locale sample matching one of the one or more catalog patterns, storing one or more display format parameters corresponding to the matched catalog pattern in a locale definition, the one or more display format parameters indicating a format of how the first set of information is displayed on the first page of data;
including the locale definition in a locale package;
installing the locale package on an operating system; and
displaying a second set of information on a second page of data according to the one or more display format parameters included in the locale package.

9. The information handling system of claim 8 wherein the processors perform additional actions comprising:
    displaying a user interface in response to receiving the selection of the first set of information; and
    receiving, in response to displaying the user interface, an indication from a user to generate the locale package utilizing the first set of information.

10. The information handling system of claim 8 wherein the processors perform additional actions comprising:
    in response to determining that each of the one or more catalog patterns fail to match the selected unknown locale sample:
        sending a request to a user for a user-specified locale pattern;
        receiving the user-specified locale pattern from the user; and
        storing the one or more display format parameters in a locale definition, the one or more display format parameters corresponding to the user-specified locale pattern; and
        storing the locale definition in the locale package.

11. The information handling system of claim 8 wherein the parsing results in a plurality unknown locale samples, the processors performing additional actions comprising:
    matching one of the one or more catalog patterns with each of the plurality of unknown locale samples, the matching resulting in a plurality of matching catalog patterns; and
    storing a plurality of locale definitions in the locale package that correspond to the plurality of matching catalog patterns.

12. The information handling system of claim 8 wherein the locale definition corresponds to a locale type that is selected from the group consisting of a language locale type, a country locale type, a currency locale type, a monetary locale type, a time locale type, and a date locale type.

13. The information handling system of claim 8 wherein the processors perform additional actions comprising:
    storing the locale package in a locale storage area; and
    installing the locale package on an operating system.

14. The information handling system of claim 8 wherein the processors perform additional actions comprising:
    uploading the locale package to a locale service.

15. A computer program product stored in a computer readable storage medium, comprising computer program code that, when executed by an information handling system, causes the information handling system to perform actions comprising:
    displaying a first page of data;
    receiving a selection of a first set of information included in the first page of data;
    parsing the first set of information into one or more unknown locale samples;
    comparing a selected one of the unknown locale samples to one or more catalog patterns;
    in response to the selected unknown locale sample matching one of the one or more catalog patterns, storing one or more display format parameters corresponding to the matched catalog pattern in a locale definition, the one or more display format parameters indicating a format of how the first set of information is displayed on the first page of data;
    including the locale definition in a locale package;
    installing the locale package on an operating system; and
    displaying a second set of information on a second page of data according to the one or more display format parameters included in the locale package.

16. The computer program product of claim 15 wherein the information handling system performs further actions comprising:
    displaying a user interface in response to receiving the selection of the first set of information; and
    receiving, in response to displaying the user interface, an indication from a user to generate the locale package utilizing the first set of information.

17. The computer program product of claim 15 wherein the information handling system performs further actions comprising:
    in response to determining that each of the one or more catalog patterns fail to match the selected unknown locale sample:
        sending a request to a user for a user-specified locale pattern;
        receiving the user-specified locale pattern from the user; and
        storing the one or more display format parameters in a locale definition, the one or more display format parameters corresponding to the user-specified locale pattern; and
        storing the locale definition in the locale package.

18. The computer program product of claim 15 wherein the parsing results in a plurality unknown locale samples, the information handling system performing further actions comprising:
    matching one of the one or more catalog patterns with each of the plurality of unknown locale samples, the matching resulting in a plurality of matching catalog patterns; and
    storing a plurality of locale definitions in the locale package that correspond to the plurality of matching catalog patterns.

19. The computer program product of claim 15 wherein the locale definition corresponds to a locale type that is selected from the group consisting of a language locale type, a country locale type, a currency locale type, a monetary locale type, a time locale type, and a date locale type.

20. The computer program product of claim 15 wherein the information handling system performs further actions comprising:
    storing the locale package in a locale storage area; and
    installing the locale package on an operating system.

21. The computer program product of claim 15 wherein the information handling system performs further actions comprising:
    uploading the locale package to a locale service.

22. A method comprising:
    displaying a first page of data;
    receiving a selection of a first set of information included in the first page of data;
    displaying a user interface in response to receiving the selection of the first set of information;
    receiving, in response to displaying the user interface, an indication from a user to generate the locale package utilizing the first set of information;
    parsing the first set of information into one or more unknown locale samples in response to receiving the indication from the user;
    selecting one of the one or more unknown locale samples;
    comparing the selected unknown locale sample to one or more catalog patterns;
    determining whether the selected unknown locale sample matches one of the one or more catalog patterns;
    in response to determining that one of the one or more catalog patterns matches the selected sample pattern:

storing one or more display format parameters in a locale definition, the one or more display format parameters corresponding to the matched catalog pattern and based upon a format of how the first set of information is displayed on the first page of data; and storing the locale definition in a locale package;

installing the locale package on an operating system; and displaying a second set of information on a second page of data according to the one or more display format parameters included in the locale package.

\* \* \* \* \*